United States Patent
Wood et al.

(10) Patent No.: US 10,133,612 B2
(45) Date of Patent: Nov. 20, 2018

(54) SESSION PROCESSING INTERACTION BETWEEN TWO OR MORE VIRTUAL ASSISTANTS

(71) Applicant: Nuance Communications, Inc., Burlington, MA (US)

(72) Inventors: Patrick S. Wood, Raleigh, NC (US); Andrew J. Braun, Cary, NC (US)

(73) Assignee: Nuance Communications, Inc., Burlington, MA (US)

( * ) Notice: Subject to any disclaimer, the term of this patent is extended or adjusted under 35 U.S.C. 154(b) by 26 days.

(21) Appl. No.: 15/072,778

(22) Filed: Mar. 17, 2016

(65) Prior Publication Data
US 2017/0269975 A1    Sep. 21, 2017

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G10L 15/18 | (2013.01) |
| G10L 15/22 | (2006.01) |
| G10L 15/26 | (2006.01) |
| G06Q 10/10 | (2012.01) |
| G06F 3/16 | (2006.01) |

(52) U.S. Cl.
CPC .............. *G06F 9/54* (2013.01); *G06Q 10/101* (2013.01); *G06Q 10/103* (2013.01); *G10L 15/1815* (2013.01); *G10L 15/22* (2013.01); *G10L 15/26* (2013.01); *G06F 3/167* (2013.01)

(58) Field of Classification Search
None
See application file for complete search history.

(56) References Cited

U.S. PATENT DOCUMENTS 8,600,746 B1 * 12/2013 Lei .......................... G10L 15/22
704/235
2012/0265528 A1   10/2012 Gruber et al.
(Continued)

FOREIGN PATENT DOCUMENTS

| EP | 1202540 A2 * | 5/2002 | ............ H04M 1/271 |
|---|---|---|---|
| WO | WO 2015/039105 | 3/2015 | |
| WO | WO 2017/161139 A1 | 9/2017 | |

OTHER PUBLICATIONS

International Search Report and Written Opinion for International Application No. PCT/US2017/022748, entitled "Session Processing Interaction Between Two or More Virtual Assistants," dated Sep. 2, 2017.

*Primary Examiner* — Tuan C Dao
*Assistant Examiner* — William C Wood
(74) *Attorney, Agent, or Firm* — Hamilton, Brook, Smith & Reynolds, P.C.

(57) ABSTRACT

Devices and systems supporting more than one Virtual Assistant (VA) are able to initiate and collaborate with multiple virtual assistants within the same session and at the same time. This system allows application specific virtual assistants to register and listen for intents from a general purpose virtual assistant. When the general purpose virtual assistant raises an intent, control can be passed to an interested application specific virtual assistant for handling. The system of registering new intents increases the knowledge of the general purpose virtual assistant, or overloads the handling of an existing intent.

20 Claims, 7 Drawing Sheets

(56) References Cited

U.S. PATENT DOCUMENTS

| | | | |
|---|---|---|---|
| 2014/0130039 A1* | 5/2014 | Chaplik | G06F 9/45558 718/1 |
| 2014/0244712 A1* | 8/2014 | Walters | H04L 67/10 709/202 |
| 2014/0259028 A1* | 9/2014 | Atwood | G06F 9/543 719/313 |
| 2014/0278436 A1 | 9/2014 | Khanna et al. | |
| 2015/0045003 A1 | 2/2015 | Vora et al. | |
| 2015/0186156 A1* | 7/2015 | Brown | G06F 3/04817 715/706 |
| 2016/0065660 A1* | 3/2016 | Miyata | H04L 67/1029 709/223 |
| 2016/0260431 A1* | 9/2016 | Newendorp | G10L 15/32 |

* cited by examiner

SESSION PROCESSING INTERACTION BETWEEN TWO OR MORE VIRTUAL ASSISTANTS

BACKGROUND

The paradigm for typical existing Virtual Assistants (VA's) is for different types of virtual assistants to be mutually exclusive. This limitation deters users from seeking to use virtual assistants, because users are forced to go back and forth from voice to some other type of input as they switch between various applications, each of which supports its own mutually exclusive virtual assistant.

For example, in a typical use case for existing virtual assistants, a smartphone user running a virtual assistant application may initiate a session with the virtual assistant by issuing a voice command to order food, such as a pizza. In response to such a command, the default behavior of existing virtual assistants is to perform an Internet search for the requested item (in this example, a pizza). The result of the Internet search would then be delivered to the user, which may permit the user to interact with a website to which a separate, mutually exclusive, virtual assistant application corresponds. A pizza company that is the result of the Internet search, for example, may have its own virtual assistant. To operate that virtual assistant, the user may then have to switch to a type of input other than voice (such as by typing commands), to engage in an interaction with the pizza company's virtual assistant that is fully separate from the user's previous interaction with the first virtual assistant. If the user were then to issue another request to the first virtual assistant for a different sort of service (such as to order a taxi), the user may then have to interact with another Internet search, followed by a separate interaction with another, fully separate, virtual assistant for ordering the taxi.

Because of user experiences such as the foregoing, users are therefore deterred from using conventional virtual assistants as a solution for achieving a variety of different specialized purposes.

SUMMARY OF THE INVENTION

With an embodiment according to the invention, devices and systems supporting more than one virtual assistant are able to initiate and collaborate with multiple virtual assistants within the same session and at the same time. This system allows application specific virtual assistants to register and listen for intents from a general purpose virtual assistant. When the general purpose virtual assistant raises an intent, control can be passed to an interested application specific virtual assistant for handling. The system of registering new intents increases the knowledge of the general purpose virtual assistant, or overloads the handling of an existing intent.

In accordance with an embodiment of the invention, there is provided a computer-implemented method for virtual assistant session processing. The computer-implemented method comprises, with a high level virtual assistant, responding to a user request to initiate dialog with the high level virtual assistant. The high level virtual assistant is implemented by a processor and a memory, with computer code instructions stored thereon, the processor and the memory being configured to implement the high level virtual assistant. The user request to initiate dialog with the high level virtual assistant is responded to by determining an independent specialized virtual assistant that is registered with the high level virtual assistant to process at least one intent type that corresponds to at least one user request intent that has been determined based on the user request. The determination is made from amongst a plurality of such independent specialized virtual assistants. Control of session processing of the at least one user request is passed to the independent specialized virtual assistant so determined, and communications from the independent specialized virtual assistant are monitored to identify a request to return control of the session processing to the high level virtual assistant.

In further, related embodiments, the computer-implemented method may comprise, with the high level virtual assistant: transmitting the user request over a data network to at least one speech recognition and intent processing network; and receiving over the data network, from the at least one speech recognition and intent processing network, a processed result of the user request, the processed result comprising: (i) the at least one user request intent, determined based on the user request, and (ii) a transcribed text of the at least one user request, the transcribed text being based on speech recognition processing of the user request. The method may further comprise, with the high level virtual assistant, transmitting, to the independent specialized virtual assistant so determined, notification of the at least one user request intent. The independent specialized virtual assistant, to which the notification of the at least one user request intent is transmitted, may be determined based on at least one of: a rule defined by the high level virtual assistant; and a rule configured by a user of the high level virtual assistant. For example, the independent specialized virtual assistant may be determined based on at least one of: a location of the independent specialized virtual assistant; a last used independent specialized virtual assistant registered to process the at least one intent type; a last registered independent specialized virtual assistant that was registered to process that least one intent type; a most active independent specialized virtual assistant registered to process the at least one intent type; a best rated independent specialized virtual assistant registered to process the at least one intent type; a predicted optimum independent specialized virtual assistant registered to process the at least one intent type; and a most popular independent specialized virtual assistant registered to process the at least one intent type.

In other related embodiments, the notification of the at least one user request intent may comprise (i) the at least one user request intent, and (ii) a transcribed text of the at least one user request intent, the transcribed text being based on speech recognition processing of the user request; and may further comprise at least one of: a user utterance; and a location of the user. The method may further comprise, prior to passing control to the independent specialized virtual assistant, receiving notification from a previous independent specialized virtual assistant that the previous independent specialized virtual assistant will not process the user request. The method may further comprise, subsequent to passing control to the independent specialized virtual assistant, receiving a return of control of session processing to the high level virtual assistant. The processor and the memory may comprise at least a portion of a mobile device, the processor and the memory further being configured to implement the independent specialized virtual assistant. The method may further comprise registering at least one independent specialized virtual assistant with the high level virtual assistant to process at least one intent type.

In another embodiment according to the invention, there is provided a computer system comprising: a processor; and a memory with computer code instructions stored thereon, the processor and the memory, with the computer code instructions being configured to implement: an intent arbitration module of a high level virtual assistant and a session processing control module of the high level virtual assistant. The intent arbitration module is configured to respond to a user request to initiate dialog with the high level virtual assistant by determining an independent specialized virtual assistant that is registered with the high level virtual assistant to process at least one intent type that corresponds to at least one user request intent that has been determined based on the user request, the determination being made from amongst a plurality of such independent specialized virtual assistants. The session processing control module of the high level virtual assistant is configured to (i) pass control of session processing of the at least one user request to the independent specialized virtual assistant so determined; and (ii) monitor for communication from the independent specialized virtual assistant to identify a request to return control of the session processing to the high level virtual assistant.

In further, related embodiments, the processor and the memory, with the computer code instructions are further configured to implement a speech recognition and intent processing module of the high level virtual assistant, the speech recognition and intent processing module being configured to: transmit the user request over a data network to at least one speech recognition and intent processing network; and receive over the data network, from the at least one speech recognition and intent processing network, a processed result of the user request, the processed result comprising: (i) the at least one user request intent, determined based on the user request, and (ii) a transcribed text of the at least one user request, the transcribed text being based on speech recognition processing of the user request. The processor and the memory, with the computer code instructions may be further configured to implement an intent notification module of the high level virtual assistant, the intent notification module being configured to transmit, to the independent specialized virtual assistant so determined, notification of the at least one user request intent. The intent arbitration module may be further configured to determine the independent specialized virtual assistant, to which the notification of the at least one user request intent is transmitted, based on at least one of: a rule defined by the high level virtual assistant; and a rule configured by a user of the high level virtual assistant. For example, the independent specialized virtual assistant may be determined based on at least one of: a location of the independent specialized virtual assistant; a last used independent specialized virtual assistant registered to process the at least one intent type; a last registered independent specialized virtual assistant that was registered to process that least one intent type; a most active independent specialized virtual assistant registered to process the at least one intent type; a best rated independent specialized virtual assistant registered to process the at least one intent type; a predicted optimum independent specialized virtual assistant registered to process the at least one intent type; and a most popular independent specialized virtual assistant registered to process the at least one intent type. The notification of the at least one user request intent may comprise (i) the at least one user request intent, and (ii) a transcribed text of the at least one user request intent, the transcribed text being based on speech recognition processing of the user request; and the notification may further comprise a user utterance; and a location of the user.

In further, related embodiments, the session processing control module may be further configured to, prior to passing control to the independent specialized virtual assistant, receive notification from a previous independent specialized virtual assistant that the previous independent specialized virtual assistant will not process the user request. The session processing control module may be further configured to, subsequent to passing control to the independent specialized virtual assistant, receive a return of control of session processing to the high level virtual assistant. The processor and the memory may comprise at least a portion of a mobile device, the processor and the memory further being configured to implement the independent specialized virtual assistant. The processor and the memory, with the computer code instructions may be further configured to implement a virtual assistant registration module configured to register at least one independent specialized virtual assistant with the high level virtual assistant to process at least one intent type.

In another embodiment according to the invention, there is provided a non-transitory computer-readable medium configured to store instructions for virtual assistant session processing, the instructions, when loaded and executed by a processor, cause the processor to respond to a user request to initiate dialog with a high level virtual assistant by: determining an independent specialized virtual assistant that is registered with the high level virtual assistant to process at least one intent type that corresponds to at least one user request intent that has been determined based on the user request, the determination being made from amongst a plurality of such independent specialized virtual assistants; passing control, to the independent specialized virtual assistant so determined, of session processing of the at least one user request; and monitoring for communication from the independent specialized virtual assistant to identify a request to return control of the session processing to the high level virtual assistant.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

An embodiment according to the invention relates to collision, transition and precedence introduced when interacting with a system supporting multiple independent Virtual Assistants (VA's).

With an embodiment according to the invention, devices and/or systems supporting more than one Virtual Assistant (VA) are able to initiate and collaborate with multiple virtual assistants within the same session and at the same time. This system allows application specific virtual assistants to register and listen for intents from a general purpose virtual assistant. When the general purpose virtual assistant raises an intent, control can be passed to an interested application specific virtual assistant for handling. The system of registering new intents increases the "knowledge" of the general purpose virtual assistant, or overloads the handling of an existing intent.

An example use-case is a smartphone user running a virtual assistant, such as the Dragon® application, sold by Nuance Communications, Inc. of Burlington, Mass., U.S.A. In the example, the user initiates a virtual assistant session by asking the virtual assistant—which, in accordance with an embodiment of the invention, is called a high level virtual assistant—to order a pizza. The default behavior of the "Order a Pizza" command is to perform an Internet search for the term "pizza." If, however, in accordance with an embodiment of the invention, an independent specialized virtual assistant operated by a pizza company registers for the intent "Order Pizza," the high level virtual assistant reacts by notifying/requesting that the specialized virtual assistant be included in the session. Then, the pizza company's specialized virtual assistant responds and interacts with the caller to order the pizza. During this session, the pizza company's virtual assistant takes precedence over the high level virtual assistant. However, if the caller made a request that the pizza company's specialized virtual assistant could not understand, the specialized virtual assistant would then pass recognition processing back to the high level virtual assistant.

Figure 1:
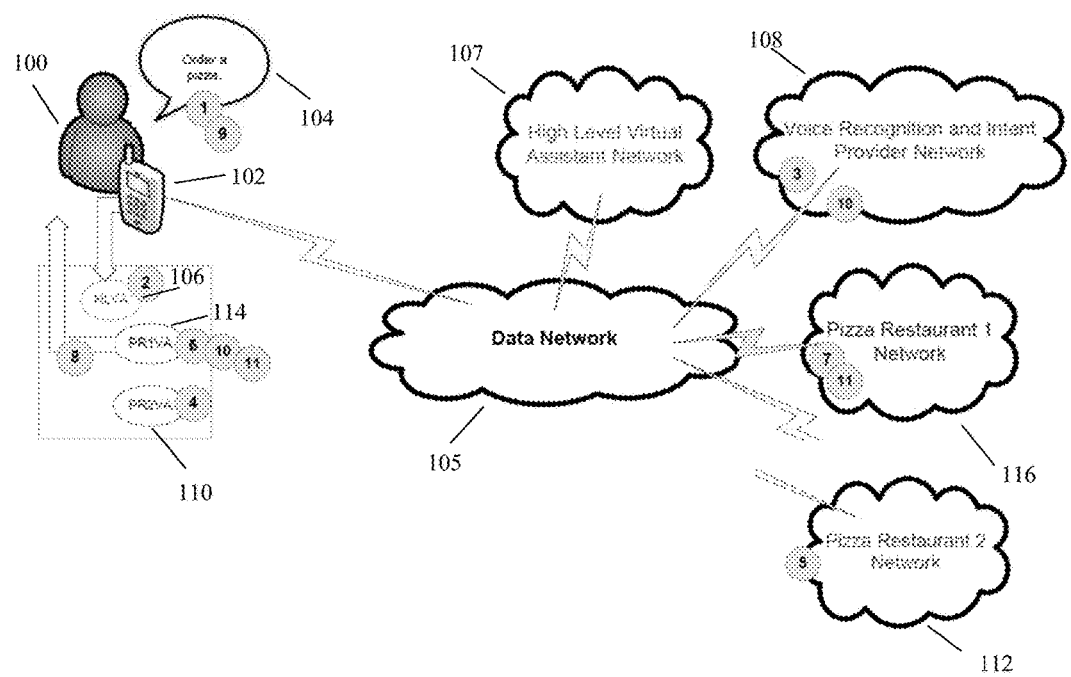
FIG. 1 is a schematic diagram of a system implementing virtual assistant session processing in accordance with an embodiment of the invention.

FIG. 1 is a schematic diagram of a system implementing virtual assistant session processing in accordance with an embodiment of the invention. In the embodiment of FIG. 1, the process flow proceeds as follows.

In step 1, the end user 100 initiates a virtual assistant dialog with a mobile device 102 by making an utterance 104 (here, "Order a pizza").

In step 2, a high level virtual assistant module 106 activates, collects and delivers the utterance 104 to a speech recognition and intent provider network 108 for processing, via a data network 105. The high level virtual assistant module 106 may also be in communication with a high level virtual assistant network 107, which may perform some or all of the processing implemented by high level virtual assistant module 106.

In step 3, speech recognition is performed by the speech recognition and intent provider network 108. Transcribed text of the utterance 104, along with the user's intent, are returned to the high level virtual assistant module 106.

In step 4, the high level virtual assistant module 106 notifies interested virtual assistants of the intent. The order with which interested virtual assistants are notified is arbitrary, but can be by location, last used, most popular, or another technique taught herein. In this example, last used is assumed. Therefore, the independent specialized virtual assistant interested in the "order pizza" intent most recently used (represented in FIG. 1 as Pizza Restaurant 2 Virtual Assistant (PR2VA) 110) is notified first. PR2VA 110 delivers a virtual assistant initiation request with its own independent specialized virtual assistant network, which here is Pizza Restaurant 2 (PR2) Network 112.

In step 5, PR2 Network 112 receives the request, which may, for example, include the following: utterance, transcription, intent and user location. Pizza Restaurant 2, however, does not provide service in the area and, therefore, passes on the request to initiate a Pizza Restaurant 2 Virtual Assistant session.

In step 6, with PR2VA 110 having passed on the virtual assistant request, high level virtual assistant module 106 notifies the next independent specialized virtual assistant interested in the "order pizza" intent (represented in FIG. 1 as Pizza Restaurant 1 Virtual Assistant (PR1VA) 114), which performs the same basic action as PR2VA 110 in step 4, above.

In step 7, Pizza Restaurant 1 (PR1) Network 116 consumes the request and responds to initiate an active Pizza Restaurant 1 Virtual Assistant session.

In step 8, PR1VA 114 having activated, signals to the high level virtual assistant module 106 that it is now taking control of the dialog with the user 100, and vocalizes to the user 100 a greeting and next steps (such as, "Thanks for ordering with <PR1>, would you like to order the usual or something else?").

In step 9, the user 100 responds to the PR1VA 114, for example with the answer "the usual."

In step 10, PR1VA 114 sends the utterance to the speech recognition and intent provider network 108 for processing. A transcribed text and the user's intent are returned.

In step 11, PR1VA 114 sends a request to PR1 Network 116 for processing. The PR1 Network 116 then confirms the order (not shown) and processes the request.

Figure 2:
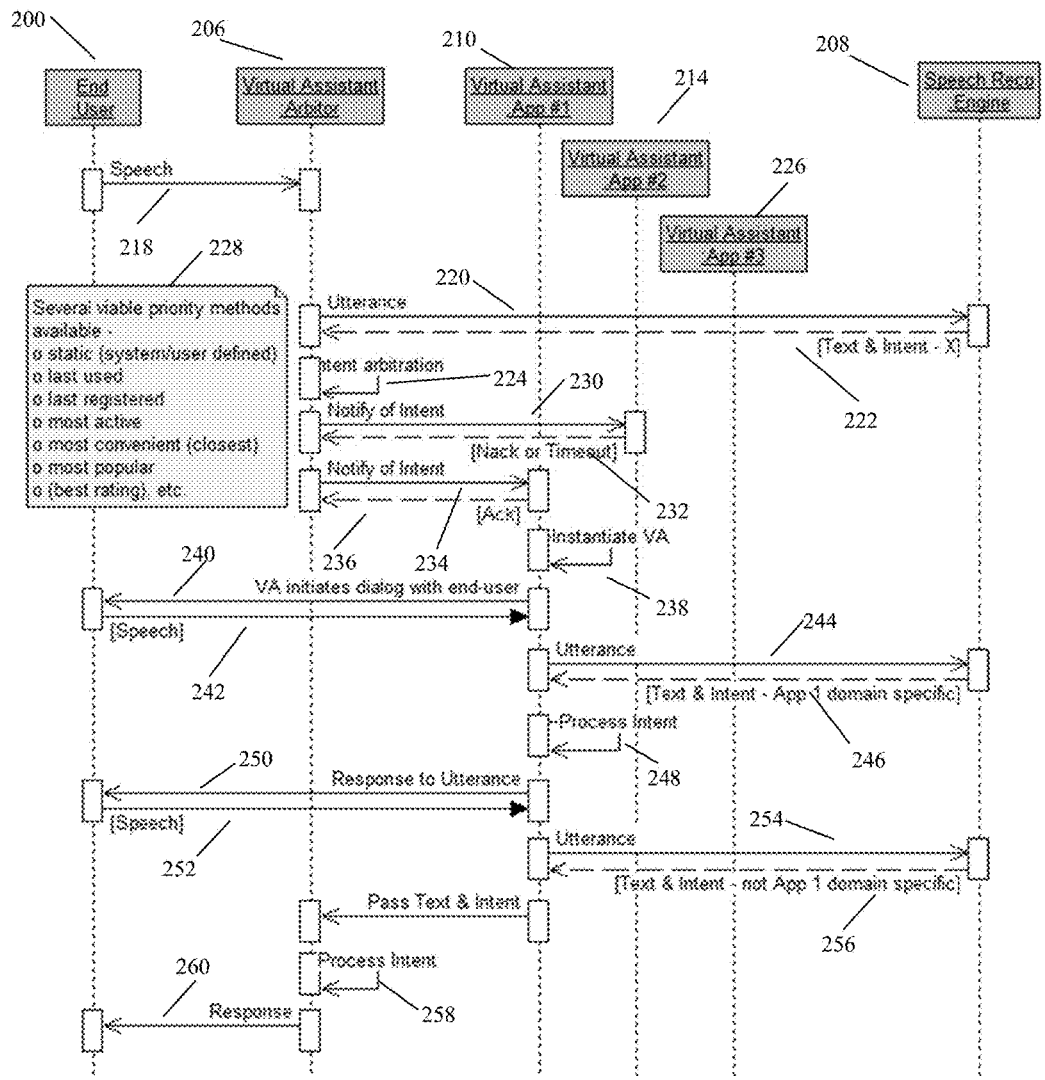
FIG. 2 is a schematic diagram of a message sequence for intent processing using multiple virtual assistants per session, in accordance with an embodiment of the invention.

FIG. 2 is a schematic diagram of a message sequence for intent processing using multiple virtual assistants per session, in accordance with an embodiment of the invention. In the embodiment of FIG. 2, an end user 200 issues a speech message 218 to a virtual assistant arbiter 206, which functions as a high level virtual assistant as taught herein. The virtual assistant arbiter 206 next sends a transmission message 220 of the utterance to a speech recognition and intent processing engine 208, which returns a message 222 containing the text and intent of the user's speech, to the virtual assistant arbiter 206. The virtual assistant arbiter 206 next determines which of several different possible independent specialized virtual assistants 210, 214, 226 to use to process the user's intent, by performing intent arbitration 224. The intent arbitration 224 may be performed based on one or more of several different possible priority methods 228, which may be defined in a rule, which may be static, and which may be defined by the system, the user, or a combination of the two. The method 228 may, for example, be based on the last used, last registered, most active, most convenient (such as the closest by location), the most popular, the best rated or other aspect of the specialized virtual assistants 210, 214, 226. Once the intent arbitration 224 has resulted in the selection of one of the specialized virtual assistants 210, 214, 226, the virtual assistant arbiter 206 sends an intent notification 230 to the selected specialized virtual assistant 214. In this example, the selected specialized virtual assistant 214 does not act on the intent notification, for example by not acknowledging the intent notification 230 or by a timeout of the intent notification 230, so that control is returned 232 to the virtual assistant arbiter 206. The virtual assistant arbiter 206 then issues a further intent notification 234 to a next selected specialized virtual assistant 210, which acknowledges 236 the intent notification 234 and instantiates 238 a specialized virtual assistant. The specialized virtual assistant 210 then initiates a dialog 240 with the end user 200, who issues further speech 242 to the specialized virtual assistant 210. The specialized virtual assistant 210 then transmits 244 the user's utterance to the speech recognition and intent processing engine 208, which returns a message 246 containing the text and intent of the user's speech, to the specialized virtual assistant 210. In this case, the user's speech and intent are assumed to be domain-specific to the specialized virtual assistant 210, and, therefore, the specialized virtual assistant 210 is able to process the user's intent 248, and responds to the user's utterance 250. Next, however, in this example, the end user 200 issues further speech 252 that is not domain-specific to the specialized virtual assistant 210. Having transmitted 254 the user's utterance to the speech recognition and intent processing engine 208, which returns a message 256 containing the text and intent of the user's speech, the specialized virtual assistant 210 then passes on the text and intent of the user's speech and returns control to the virtual assistant arbiter 206. The virtual assistant 206 then processes 258 the user's intent, and responds 260.

Figure 3:
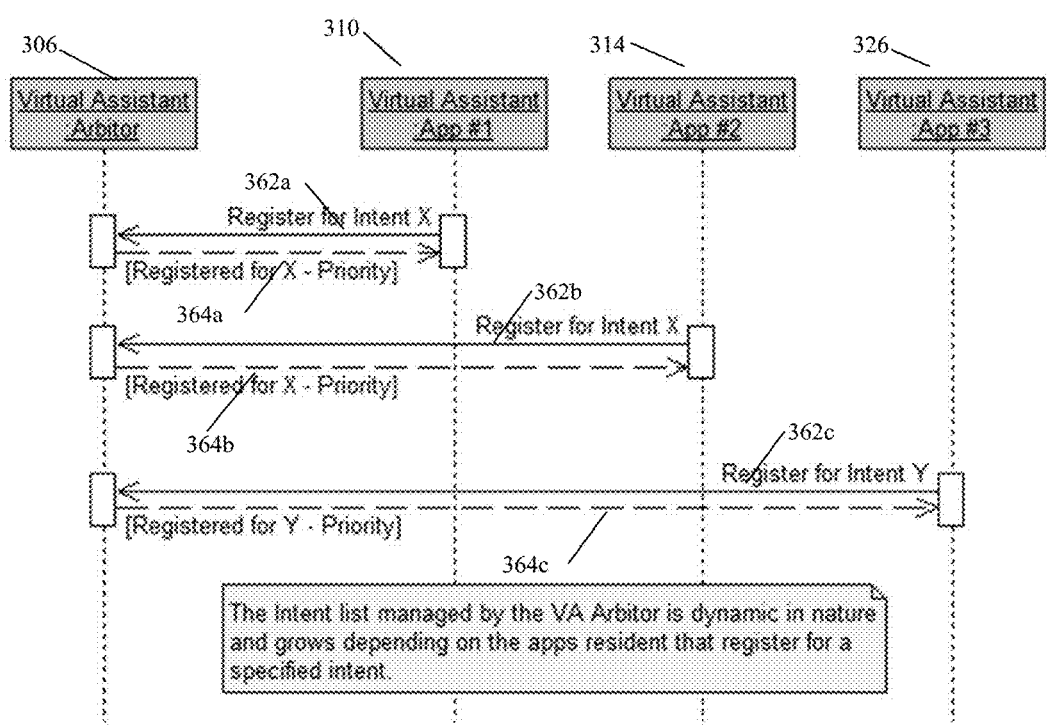
FIG. 3 is a schematic diagram of a process for intent registration, using multiple virtual assistants per session, in accordance with an embodiment of the invention.

FIG. 3 is a schematic diagram of a process for intent registration, using multiple virtual assistants per session, in accordance with an embodiment of the invention. In the embodiment of FIG. 3, three different specialized virtual assistants 310, 314 and 326 register with a virtual assistant arbiter 306 for a given user intent type. For example, each of the specialized virtual assistants 310, 314 and 326 may send a message 362a, 362b, 362c to register for given intent, to which the virtual assistant arbiter 306 responds with a message 364a, 364b, 364c indicating that the respective specialized virtual assistant is registered for a given user intent type and may also include a priority assigned to that specialized virtual assistant for that intent type. In this example, specialized virtual assistants 310 and 314 are both registered for user intent type "X," whereas specialized virtual assistant 326 registers for user intent type "Y." The virtual assistant arbiter 306 manages an intent list (implemented, for example, in a lookup table stored in a memory) by which each of the specialized virtual assistants 310, 314 and 326 is assigned to a specific user intent type. The intent list managed by the virtual assistant arbiter 306 is dynamic in nature, and grows depending on the specialized virtual assistants that register for a specified intent. In one embodiment, the specialized virtual assistants and the high level virtual assistant (or virtual assistant arbiter) are applications (also known as apps), which may be resident on a mobile device or other type of device or system. The virtual assistant arbiter 306 assigns a priority to each of the specialized virtual assistants 310, 314 and 326 that register for a given user intent type, for example using any of the priority techniques taught herein, including last used, most popular, etc.

Figure 4:
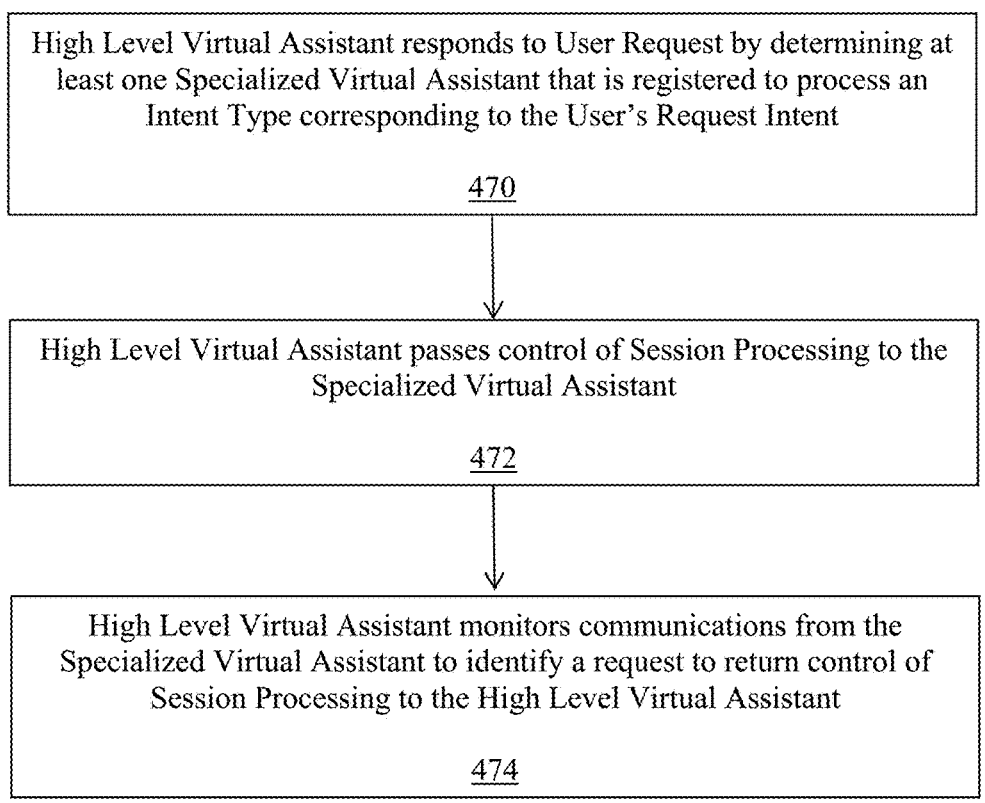
FIG. 4 is a schematic block diagram of a computer-implemented method for virtual assistant session processing in accordance with an embodiment of the invention.

FIG. 4 is a schematic block diagram of a computer-implemented method for virtual assistant session processing in accordance with an embodiment of the invention. The method includes, at step 470, with a high level virtual assistant, responding to a user request to initiate dialog with the high level virtual assistant by determining an independent specialized virtual assistant that is registered with the high level virtual assistant to process at least one intent type that corresponds to at least one user request intent that has been determined based on the user request. The determination is made from amongst a plurality of such independent specialized virtual assistants. At step 472, the high level virtual assistant passes control, to the independent specialized virtual assistant so determined, of session processing of the at least one user request. At step 474, the high level virtual assistant monitors for communication from the independent specialized virtual assistant to identify a request to return control of the session processing to the high level virtual assistant. Such monitoring may, for example, include a process of the high level virtual assistant running to monitor for a return of control message from the specialized virtual assistant.

Figure 5:
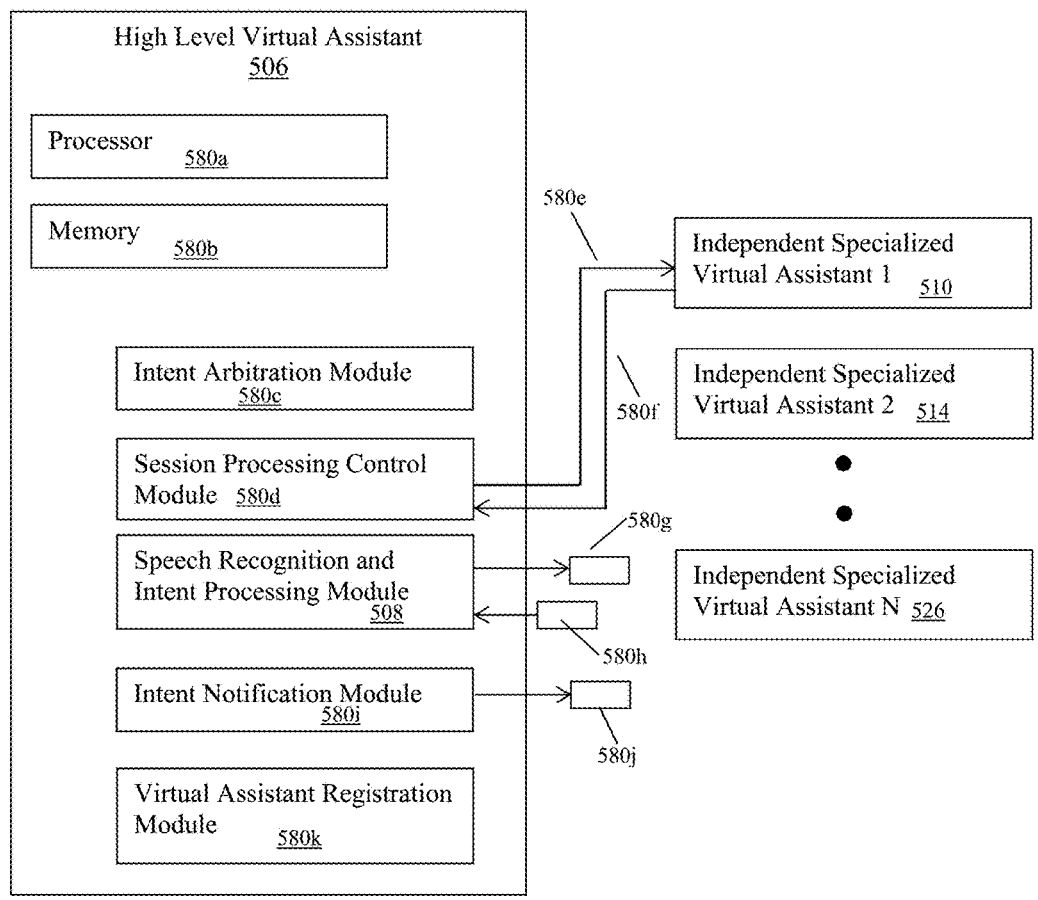
FIG. 5 is a schematic block diagram of a computer system for virtual assistant session processing in accordance with an embodiment of the invention.

FIG. 5 is a schematic diagram of a computer system for virtual assistant session processing in accordance with an embodiment of the invention. The system includes a processor 580a and a memory 580b with computer code instructions stored on it. The processor 580a and the memory 580b, with the computer code instructions are configured to implement an intent arbitration module 580c of a high level virtual assistant 506, and a session processing control module 580d of the high level virtual assistant 506. The intent arbitration module 580c is configured to respond to a user request to initiate dialog with the high level virtual assistant 506 by determining an independent specialized virtual assistant 510, 514, 526 (in this case, there are N independent specialized virtual assistants labeled 1, 2, . . . N) that is registered with the high level virtual assistant 506 to process at least one intent type that corresponds to at least one user request intent that has been determined based on the user request. The session processing control module 580d is configured to (i) pass control 580e of session processing of the at least one user request to the independent specialized virtual assistant 510 so determined; and (ii) monitor for communication 580f from the independent specialized virtual assistant 510 to identify a request to return control of the session processing to the high level virtual assistant 506.

In the embodiment of FIG. 5, the processor 580a and the memory 580b, with the computer code instructions are further configured to implement a speech recognition and intent processing module 508 of the high level virtual assistant 506. The speech recognition and intent processing module 508 is configured to: transmit the user request 580g over a data network to at least one speech recognition and intent processing network; and receive over the data network, from the at least one speech recognition and intent processing network, a processed result 580h of the user request. The processed result 580h comprises: (i) at least one user request intent, determined based on the user request, and (ii) a transcribed text of the at least one user request, the transcribed text being based on speech recognition processing of the user request 580g.

In addition, the processor 580a and the memory 580b, with the computer code instructions are further configured to implement an intent notification module 580i of the high level virtual assistant 506. The intent notification module 580i is configured to transmit, to the independent specialized virtual assistant 510 so determined, notification 580j of the at least one user request intent. The intent arbitration module 580c is further configured to determine the independent specialized virtual assistant 510, 514, 526 to which the notification 580j of the at least one user request intent is transmitted, based on at least one of: a rule defined by the high level virtual assistant 506; and a rule configured by a user of the high level virtual assistant 506. For example, the user may be able to create rules such as "use this App as a specialized virtual assistant any time that there is a pizza restaurant of its company within 10 miles of this mobile device," or any other similar user-configured rule. Users may, for example, be prompted to create rule configurations for use of one or more of the high level virtual assistant 506 or specialized virtual assistants 510, 514, 526 during set-up of those devices. In addition, the intent arbitration module 580*c* may be further configured to determine the independent specialized virtual assistant 510, 514, 526, to which the notification 580*j* of the at least one user request intent is transmitted, based on (for example, but not limited to) at least one of: a location of the independent specialized virtual assistant; a last used independent specialized virtual assistant registered to process the at least one intent type; a last registered independent specialized virtual assistant that was registered to process that least one intent type; a most active independent specialized virtual assistant registered to process the at least one intent type; a best rated independent specialized virtual assistant registered to process the at least one intent type; a predicted optimum independent specialized virtual assistant registered to process the at least one intent type; and a most popular independent specialized virtual assistant registered to process the at least one intent type. The notification 580*j* of the at least one user request intent may comprise, for example, (i) the at least one user request intent, and (ii) a transcribed text of the at least one user request intent, the transcribed text being based on speech recognition processing of the user request. The notification 580*j* of the at least one user request intent may further comprises at least one of (for example, but not limited to): a user utterance; and a location of the user. The session processing control module 580*d* may be further configured to, prior to passing control to the independent specialized virtual assistant 510, 514, 526, receive notification from a previous independent specialized virtual assistant 510, 514, 526 that the previous independent specialized virtual assistant will not process the user request. The session processing control module 580*d* may be further configured to, subsequent to passing control to the independent specialized virtual assistant 510, 514, 526, receive a return of control of session processing to the high level virtual assistant 506.

In the embodiment of FIG. 5, the processor 580*a* and the memory 580*b* may comprise at least a portion of a mobile device, the processor and the memory further being configured to implement the independent specialized virtual assistants 510, 514 and 526. The processor 580*a* and the memory 580*b*, with the computer code instructions are further configured to implement a virtual assistant registration module 580*k* configured to register at least one independent specialized virtual assistant 510, 514, 526 with the high level virtual assistant 506 to process at least one intent type.

In accordance with an embodiment of the invention, it will be appreciated that a variety of different possible user intents may be registered with a high level virtual assistant. For example, intents related to food ordering, transportation, medical insurance, answering technical questions and general information questions in any of a variety of fields, and any of a vast array of intents that can be handled by a virtual assistant, can be registered for handling by specialized virtual assistants in cooperation with a high level virtual assistant in accordance with an embodiment of the invention. Some potential advantages of such a framework are that it reduces performance constraints that are brought about by speed and memory constraints on the high level virtual assistant; it increases the ease of use of virtual assistants; it obviates the need for the high level virtual assistant to be updated, while increasing its flexibility; and it permits a continuous conversation with multiple different specialized virtual assistants.

In an embodiment according to the invention, processes described as being implemented by one processor may be implemented by component processors configured to perform the described processes. Such component processors may be implemented on a single machine, on multiple different machines, in a distributed fashion in a network, or as program module components implemented on any of the foregoing.

Figure 6:
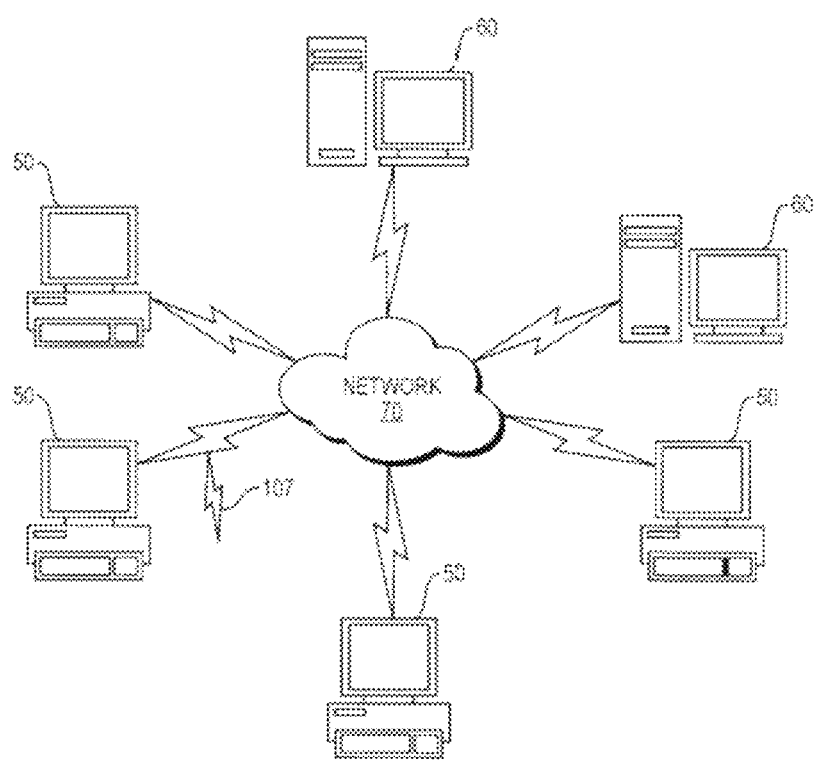
FIG. 6 illustrates a computer network or similar digital processing environment in which embodiments of the present invention may be implemented.

FIG. 6 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 7:
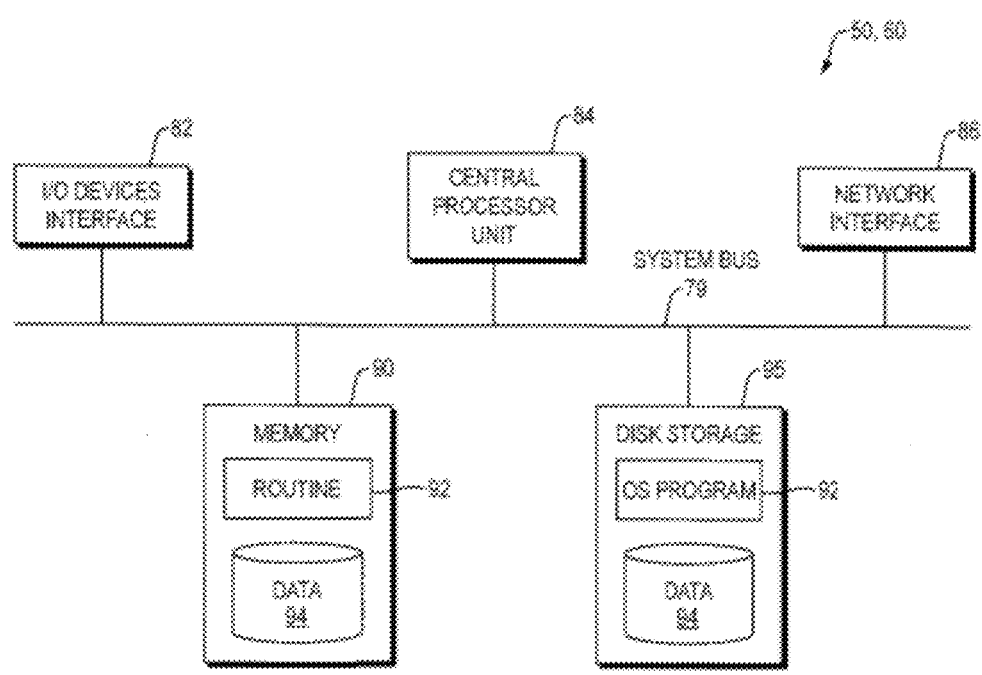
FIG. 7 is a diagram of an example internal structure of a computer (e.g., client processor/device or server computers) in the computer system of FIG. 6.

FIG. 7 is a diagram of an example internal structure of a computer (e.g., client processor/device 50 or server computers 60) in the computer system of FIG. 6. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 6). Memory 90 provides volatile storage for computer software instructions 92 and data 94 used to implement an embodiment of the present invention (e.g., intent arbitration module, session processing control module, speech recognition and intent processing module, intent notification module, virtual assistant registration module, high level virtual assistant and specialized virtual assistants detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for virtual assistant session processing, the computer-implemented method comprising:
   with a high level virtual assistant, implemented by a processor and a memory, with computer code instructions stored thereon, the processor and the memory being configured to implement the high level virtual assistant, responding to a user request from a user to initiate dialog with the high level virtual assistant by:
   initiating session processing of a communications session of the high level virtual assistant with the user;
   determining an independent specialized virtual assistant that is registered with the high level virtual assistant as having interest in processing at least one intent type that corresponds to at least one user request intent that has been determined based on the user request, the determination being made from amongst a plurality of such independent specialized virtual assistants having autonomy to accept or reject requests to process user requests for the at least one intent type;
   upon acceptance by the independent specialized virtual assistant so determined of a request to be included in the communications session of the high level virtual assistant with the user, including the independent specialized virtual assistant in the communications session of the high level virtual assistant with the user, and passing control, to the independent specialized virtual assistant, of session processing of the communications session; and
   monitoring for communication from the independent specialized virtual assistant to identify a request to return control of the session processing to the high level virtual assistant.

2. The computer-implemented method of claim 1, further comprising, with the high level virtual assistant:
   transmitting the user request over a data network to at least one speech recognition and intent processing network; and
   receiving over the data network, from the at least one speech recognition and intent processing network, a processed result of the user request, the processed result comprising: (i) the at least one user request intent, determined based on the user request, and (ii) a transcribed text of the at least one user request, the transcribed text being based on speech recognition processing of the user request.

3. The computer-implemented method of claim 1, further comprising, with the high level virtual assistant:
   transmitting, to the independent specialized virtual assistant so determined, notification of the at least one user request intent.

4. The computer-implemented method of claim 3, wherein the independent specialized virtual assistant, to which the notification of the at least one user request intent is transmitted, is determined based on at least one of:
   a rule defined by the high level virtual assistant; and
   a rule configured by a user of the high level virtual assistant.

5. The computer-implemented method of claim 4, wherein the independent specialized virtual assistant, to which the notification of the at least one user request intent is transmitted, is determined based on at least one of:
   a location of the independent specialized virtual assistant;
   a last used independent specialized virtual assistant registered to process the at least one intent type;
   a last registered independent specialized virtual assistant that was registered to process that least one intent type;
   a most active independent specialized virtual assistant registered to process the at least one intent type;
   a best rated independent specialized virtual assistant registered to process the at least one intent type;
   a predicted optimum independent specialized virtual assistant registered to process the at least one intent type; and
   a most popular independent specialized virtual assistant registered to process the at least one intent type.

6. The computer-implemented method of claim 3, wherein the notification of the at least one user request intent comprises (i) the at least one user request intent, and (ii) a transcribed text of the at least one user request intent, the transcribed text being based on speech recognition processing of the user request.

7. The computer-implemented method of claim 6, wherein the notification of the at least one user request intent further comprises at least one of:
   a user utterance; and
   a location of the user.

8. The computer-implemented method of claim 1, further comprising, prior to passing control to the independent specialized virtual assistant, receiving notification from a previous independent specialized virtual assistant that the previous independent specialized virtual assistant will not process the user request.

9. The computer-implemented method of claim 1, further comprising, subsequent to passing control to the independent specialized virtual assistant, receiving a return of control of session processing to the high level virtual assistant.

10. The computer-implemented method of claim 1, wherein the processor and the memory comprise at least a portion of a mobile device, the processor and the memory further being configured to implement the independent specialized virtual assistant.

11. The computer-implemented method of claim 1, further comprising:
   registering at least one independent specialized virtual assistant with the high level virtual assistant to process at least one intent type.

12. A computer system comprising:
   a processor; and a memory with computer code instructions stored thereon, the processor and the memory, with the computer code instructions being configured to implement:
  an intent arbitration module of a high level virtual assistant, the intent arbitration module being configured to respond to a user request from a user to initiate dialog with the high level virtual assistant by initiating session processing of a communications session of the high level virtual assistant with the user and determining an independent specialized virtual assistant that is registered with the high level virtual assistant as having interest in processing at least one intent type that corresponds to at least one user request intent that has been determined based on the user request, the determination being made from amongst a plurality of such independent specialized virtual assistants having autonomy to accept or reject requests to process user requests for the at least one intent type;
  a session processing control module of the high level virtual assistant, the session processing control module being configured to:
    (i) upon acceptance by the independent specialized virtual assistant so determined of a request to be included in the communications session of the high level virtual assistant with the user, include the independent specialized virtual assistant in the communications session of the high level virtual assistant with the user;
    (ii) pass control of session processing of the communications session to the independent specialized virtual assistant; and
    (iii) monitor for communication from the independent specialized virtual assistant to identify a request to return control of the session processing to the high level virtual assistant.

13. The computer system of claim 12, wherein the processor and the memory, with the computer code instructions are further configured to implement a speech recognition and intent processing module of the high level virtual assistant, the speech recognition and intent processing module being configured to:
  transmit the user request over a data network to at least one speech recognition and intent processing network; and
  receive over the data network, from the at least one speech recognition and intent processing network, a processed result of the user request, the processed result comprising: (i) the at least one user request intent, determined based on the user request, and (ii) a transcribed text of the at least one user request, the transcribed text being based on speech recognition processing of the user request.

14. The computer system of claim 12, wherein the processor and the memory, with the computer code instructions are further configured to implement an intent notification module of the high level virtual assistant, the intent notification module being configured to transmit, to the independent specialized virtual assistant so determined, notification of the at least one user request intent.

15. The computer system of claim 14, wherein the intent arbitration module is further configured to determine the independent specialized virtual assistant, to which the notification of the at least one user request intent is transmitted, based on at least one of:
  a rule defined by the high level virtual assistant; and
  a rule configured by a user of the high level virtual assistant.

16. The computer system of claim 15, wherein the intent arbitration module is further configured to determine the independent specialized virtual assistant, to which the notification of the at least one user request intent is transmitted, based on at least one of:
  a location of the independent specialized virtual assistant;
  a last used independent specialized virtual assistant registered to process the at least one intent type;
  a last registered independent specialized virtual assistant that was registered to process that least one intent type;
  a most active independent specialized virtual assistant registered to process the at least one intent type;
  a best rated independent specialized virtual assistant registered to process the at least one intent type;
  a predicted optimum independent specialized virtual assistant registered to process the at least one intent type; and
  a most popular independent specialized virtual assistant registered to process the at least one intent type.

17. The computer system of claim 12, wherein the session processing control module is further configured to, subsequent to passing control to the independent specialized virtual assistant, receive a return of control of session processing to the high level virtual assistant.

18. The computer system of claim 12, wherein the processor and the memory comprise at least a portion of a mobile device, the processor and the memory further being configured to implement the independent specialized virtual assistant.

19. The computer system of claim 12, wherein the processor and the memory, with the computer code instructions are further configured to implement a virtual assistant registration module configured to register at least one independent specialized virtual assistant with the high level virtual assistant to process at least one intent type.

20. A non-transitory computer-readable medium configured to store instructions for virtual assistant session processing, the instructions, when loaded and executed by a processor, cause the processor to respond to a user request from a user to initiate dialog with a high level virtual assistant by:
  initiating session processing of a communications session of the high level virtual assistant with the user;
  determining an independent specialized virtual assistant that is registered with the high level virtual assistant as having interest in processing at least one intent type that corresponds to at least one user request intent that has been determined based on the user request, the determination being made from amongst a plurality of such independent specialized virtual assistants having autonomy to accept or reject requests to process user requests for the at least one intent type;
  upon acceptance by the independent specialized virtual assistant so determined of a request to be included in the communications session of the high level virtual assistant with the user, including the independent specialized virtual assistant in the communications session of the high level virtual assistant with the user, and passing control, to the independent specialized virtual assistant, of session processing of the communications session; and
  monitoring for communication from the independent specialized virtual assistant to identify a request to return control of the session processing to the high level virtual assistant.

* * * * *